(12) United States Patent
Spring et al.

(10) Patent No.: US 12,409,619 B2
(45) Date of Patent: Sep. 9, 2025

(54) WAFER ALIGNMENT FEATURES

(71) Applicant: HEPTAGON PHOTONICS PTE. LTD., Singapore (SG)

(72) Inventors: Nicola Spring, Ziegelbrücke (CH); Uros Markovic, Zurich (CH)

(73) Assignee: HEPTAGON PHOTONICS PTE. LTD., Singapore (SG)

( * ) Notice: Subject to any disclaimer, the term of this patent is extended or adjusted under 35 U.S.C. 154(b) by 708 days.

(21) Appl. No.: 17/436,803

(22) PCT Filed: Mar. 11, 2020

(86) PCT No.: PCT/SG2020/050127
§ 371 (c)(1),
(2) Date: Sep. 7, 2021

(87) PCT Pub. No.: WO2020/185163
PCT Pub. Date: Sep. 17, 2020

(65) Prior Publication Data
US 2022/0168978 A1    Jun. 2, 2022

Related U.S. Application Data

(60) Provisional application No. 62/817,015, filed on Mar. 12, 2019.

(51) Int. Cl.
*B29D 11/00* (2006.01)
*B29K 683/00* (2006.01)
(Continued)

(52) U.S. Cl.
CPC ........ *B29D 11/0074* (2013.01); *G02B 3/0031* (2013.01); *G02B 5/1852* (2013.01); *B29K 2683/00* (2013.01); *B29K 2709/08* (2013.01)

(58) Field of Classification Search
None
See application file for complete search history.

(56) References Cited

U.S. PATENT DOCUMENTS

2009/0159200 A1    6/2009  Rossi et al.
2010/0157428 A1    6/2010  Wu et al.
(Continued)

FOREIGN PATENT DOCUMENTS

CN    108735863 A     11/2018
WO    2014092148 A1    6/2014
WO    2019054940 A1    3/2019

OTHER PUBLICATIONS

International Search Report and Written Opinion for Application No. PCT/SG2020/050127 dated Jun. 26, 2020.
(Continued)

*Primary Examiner* — Barbara J Musser
(74) *Attorney, Agent, or Firm* — VIERING, JENTSCHURA & PARTNER mbB

(57) ABSTRACT

A method of manufacturing a plurality of optical elements includes providing a first wafer (200) having lower alignment features (192) arranged on a first surface of the substrate, providing a second wafer (201) comprising, on a replication side, a plurality of replication sections, each replication section defining a surface structure of one of the optical elements, the second wafer (201) further comprising upper alignment features (194) protruding, on the replication side, further than an outermost feature of the replication sections, depositing liquid droplets (196) on the first side of the first wafer (200), and bringing the second wafer (201) and the first side of the first wafer (200) together, with liquid droplets (196) between the first wafer (200) and the second wafer (201), the upper alignment features (194) contacting the liquid droplets (196) on the lower alignment features
(Continued)

(192) on the first side of the first wafer (200), and thereby causing the second wafer (201) to align with the first wafer (200) by capillary action.

10 Claims, 3 Drawing Sheets

(51) Int. Cl.
*B29K 709/08* (2006.01)
*G02B 3/00* (2006.01)
*G02B 5/18* (2006.01)

(56) References Cited

U.S. PATENT DOCUMENTS

| | | |
|---|---|---|
| 2015/0168666 A1 | 6/2015 | Brouwer et al. |
| 2016/0356995 A1 | 12/2016 | Mouws et al. |
| 2018/0301433 A1 | 10/2018 | Robin et al. |

OTHER PUBLICATIONS

China National Intellectual Property Administration Office Action for Application No. 202080020436 dated Oct. 25, 2022 (14 pages including machine generated English translation).
Chinese Patent Office First Office Action for Application No. 202080020436.0 dated Apr. 18, 2023 (14 pages including machine generated English translation).

WAFER ALIGNMENT FEATURES

TECHNICAL FIELD

This disclosure relates to microfluidic alignment features.

BACKGROUND

Optical devices that include one or more optical radiation emitters and one or more optical sensors can be used in a wide range of applications including, for example, distance measurement, proximity sensing, gesture sensing, and imaging. Small optoelectronic modules such as imaging devices and light projectors employ optical assemblies that include lenses or other optical elements stacked along the device's optical axis to achieve desired optical performance. Replicated optical elements include transparent diffractive and/or refractive optical elements for influencing an optical beam. In some applications, such optoelectronic modules can be included in the housings of various consumer electronics, such as mobile computing devices, smart phones, or other devices.

SUMMARY

The present disclosure describes optical and optoelectronic assemblies that include micro-spacers, as well as methods for manufacturing such assemblies.

The substrate may be a "wafer", or other base element, with an additional structure added to it, for example with a hardened replication material structure adhering to it, defining a surface of the plurality of optical elements, with some lithographically added or removed features (such as apertures, etc.) or with some other structure. The substrate may comprise any material or material combination.

The optical elements may be any elements influencing light that is irradiating them including but not restricted to lenses/collimators, pattern generators, deflectors, mirrors, beam splitters, elements for decomposing the radiation into its spectral composition, etc., and combinations thereof. Both a replicated structure on one side of a substrate, and an ensemble of two aligned replicated optical elements on two sides of a substrate are called an "optical element".

The tool (or "replication tool") may comprise a first, hard material forming a rigid back plate and a second, softer material portion (replication portion) that forms both the contact spacer portion(s) and the replication sections. Generally, the contact spacer portion(s) may be of the same material as the portion of the tool that forms the replication sections, and may merely be structural features of the tool (not added elements). As an alternative, the contact spacer portions may comprise an additional material, for example a coating of a soft and/or adhesive material on an outermost surface.

As an alternative to a low stiffness material like PDMS, the contact spacers may also comprise an adhesive, for example an adhesive layer. Using a low stiffness material for the entire replication portion of the tool is advantageous regarding its manufacturing, as no separate step for adding the contact spacers or a coating thereof is required. The entire replication portion may be manufactured in a single shape by replicating (molding, embossing etc.) from a master or sub-master that also includes the contact spacer portion(s).

The contact spacer portions are operable to rest against the substrate during replication, with no material between the contact spacer portions and the substrate. The contact spacer portions may be contiguous or may comprise a plurality of discrete portions around the periphery or distributed over a large portion of the periphery and/or an interior of the replication surface. In other words, the contact spacer portion(s) may be in any configuration that allows the replication tool to rest against the substrate. For example, the distribution of the contact spacer portion(s) is such that contact spacer portion(s) are on both sides of every in-plane line through the center of mass of the tool. The spacers are arranged and configured such that if the tool lies on the substrate, the thickness (the z-dimension perpendicular to the substrate and tool plane) is defined by the spacer portions.

In some embodiments, a method of manufacturing a plurality of optical elements includes providing a first wafer having lower alignment features arranged on a first surface of the substrate, providing a second wafer comprising, on a replication side, a plurality of replication sections, each replication section defining a surface structure of one of the optical elements, the second wafer further comprising upper alignment features protruding, on the replication side, further than an outermost feature of the replication sections, depositing liquid droplets on the first side of the first wafer, and aligning the first wafer and the second wafer with respect to each other and bringing the second wafer and the first side of the first wafer together, with liquid droplets between the first wafer and the second wafer, the upper alignment features contacting the liquid droplets on the lower alignment features on the first side of the first wafer, and thereby causing the first wafer to align with the second wafer by capillary action.

Implementations can include one or more of the following features: the liquid droplets are deposited between the optical elements. The liquid droplets are deposited in a ring surrounding the optical elements. Depositing liquid droplets on the second wafer. Hardening the liquid droplets. Depositing liquid droplets on the first side of the first wafer between the optical elements.

In some embodiments, an apparatus for manufacturing a plurality of optical elements includes a first wafer, and a second wafer comprising, on a replication side, a plurality of replication sections, each replication section defining a surface structure of one of the optical elements, the second wafer further comprising at least one upper alignment feature, the upper alignment feature protruding, on the replication side, further than an outermost feature of the replication sections, with liquid droplets deposited on the first side of the first wafer, and the second wafer and the first wafer aligned with respect to each other and bringing the first and second wafers together, the upper alignment features contacting the liquid droplets on the lower alignment features on the first side of the first wafer, and thereby causing the first wafer to align with the second wafer by capillary action.

Implementations can include one or more of the following features: the liquid droplets are deposited between the optical elements. The liquid droplets are deposited in a ring surrounding the optical elements. Depositing liquid droplets on the second wafer. Hardening the liquid droplets. Depositing liquid droplets on the first side of the first wafer between the optical elements.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
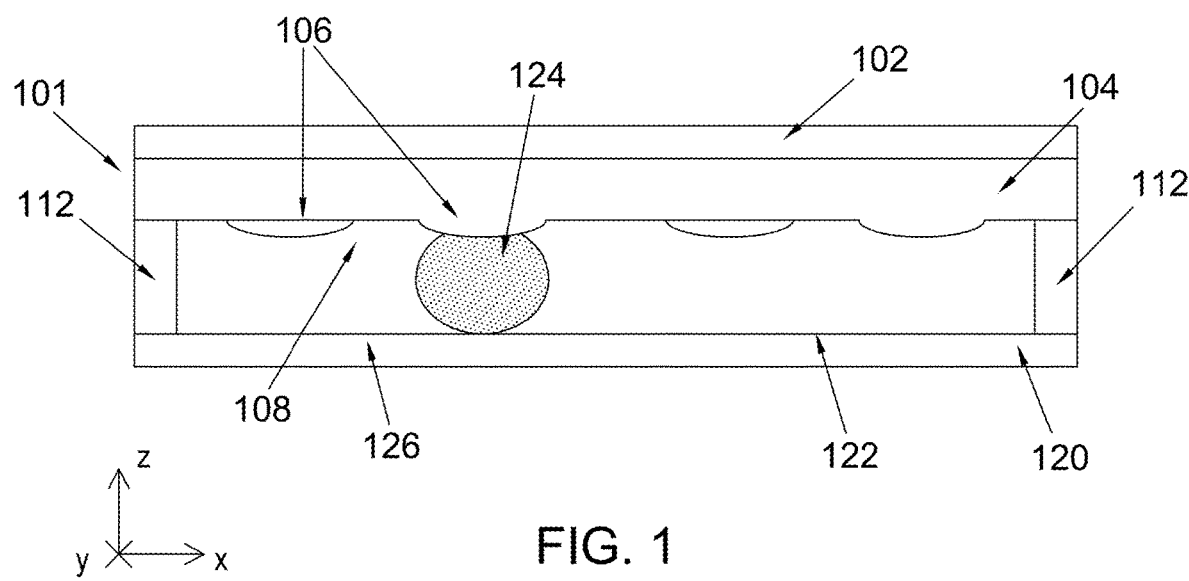
FIG. 1 illustrates an example cross sectional tool/substrate structure for replication.

FIG. 1 schematically shows a cross section through a tool 101 and a substrate 120. The tool 101 in the shown embodiment comprises a rigid backplate 102 of a first material, for example glass, and a replication portion 104 of a second, softer material, for example PDMS. The replication portion forms a replication surface 108 comprising a plurality of replication sections 106, the surface of each of which is a (negative) copy of a surface shape an optical element to be manufactured. The replication sections 106 can be convex and thus define a concave optical element surface, or be convex and define a concave optical element surface.

The replication portion 104 has contact spacer portions 112 that are illustrated as arranged peripherally. The contact spacer portions 112 are the structures of the replication tool 101 that protrude the furthest into the z direction. The contact spacer portions are essentially flat and, thus, are operable to rest against the substrate 120 during replication, with no material between the contact spacer portions 112 and the substrate 120. The contact spacer portions 112 may, for example, form a ring around the periphery of the replication surface 108, may comprise a plurality of discrete portions around the periphery, or may comprise a plurality of discrete portions distributed over a large portion of the periphery and/or an interior of the replication surface 108.

The substrate 120 has a first side (e.g., substrate surface 126) and a second side and can be any suitable material, for example glass. The substrate 120 further has a structure added to it to which the replica is to be aligned. The structure may, for example, comprise a coating 122 structured in the x-y-plane, such as a screen with apertures, or a structured IR filter etc. The structure may in addition, or as an alternative, comprise further features like markings, etc. Further, or as another alternative, the structure may comprise a hardened replication material structure constituting a surface of the optical elements.

For replicating the replication surface 108 of the tool 101, replication material 124 is applied to the substrate 120 or the tool 101 or both the tool 101 and the substrate 120. Such application of replication material 124 may include application of a plurality of portions of replication material 124, one portion for each of the replication sections, to the tool 101 and/or the substrate 120 (although a single portion of replication material 124 is illustrated in the figure). Each portion may, for example, be applied by squirting or jetting one droplet or a plurality of droplets, by a dispensing tool that may for example work in an inkjet-printer-like manner. Each portion may optionally consist of a plurality of sub-portions that come into contact with each other only during replication. Generally, the droplets are of epoxy.

After application of the replication material 124, the substrate 120 and the tool 101 are aligned with respect to each other. To this end, a process similar to the one used in so-called mask aligners may be used. The alignment process may include aligning at least one particular feature (preferably two features are used) of the tool 101 and/or of the substrate 120 with at least one particular feature of the substrate 120 or the tool 101, respectively, or with a reference point of an alignment device. Suitable features for this include well-defined elements of the structure itself (such as a defined corner of a structured coating or a lens peak etc.), specifically added alignment marks, or possibly also edges etc. of the base element etc. Alignment also includes, as is known in the art, precisely making parallel the tool and substrate surfaces to avoid wedge errors; such parallelization may take place prior to the x-y-alignment.

Subsequent to the alignment, the substrate 120 and the tool 101 are brought together, with the contact spacer portions 112 resting against the substrate surface and defining (if present, together with the floating spacers) the z dimension and also locking the tool against x-y-movements. Thereafter, the substrate-tool-assembly is removed from the alignment station and transferred to a hardening station.

The replication portion 104 of the tool, or at least a surface of the contact spacer portions 112, is made of a material with a comparably low stiffness so that it can, under "normal" conditions where for example no more pressure than the one caused by gravity forces of the tool lying on the substrate or vice versa, adapt to roughnesses on a micrometer and/or sub-micrometer scale and, thus, may form an intimate connection to the substrate surface. In addition, the replication portion of the tool or at least the surface of the contact spacer portion may have a comparably low surface energy to make such adaptation to roughnesses on a micrometer and/or sub-micrometer scale favorable. A preferred example of such a material is polydimethylsiloxane PDMS.

The prior replication steps include hardening the replication material 124 after the replication tool 101 and the base element have been moved towards each other with the replication material 124 between them, and subsequently removing the replication tool 101.

To create a stack of optical elements created using multiple substrates (or wafers) the substrates must be aligned before being fixed relative to each other. To align substrates to each other, conventionally a mask alignment system is used based on a vision system and fiducials.

FIGS. 2A-3C show microfluidic alignment features 190 used to align optical elements such as hardened replication features 140 and other structures. These microfluidic alignment features 190 can be used for alignment either on a wafer or a module or stack level. The microfluidic alignment features 190 can be generated via replication, photolithography or a combination of both.

Figure 2C:
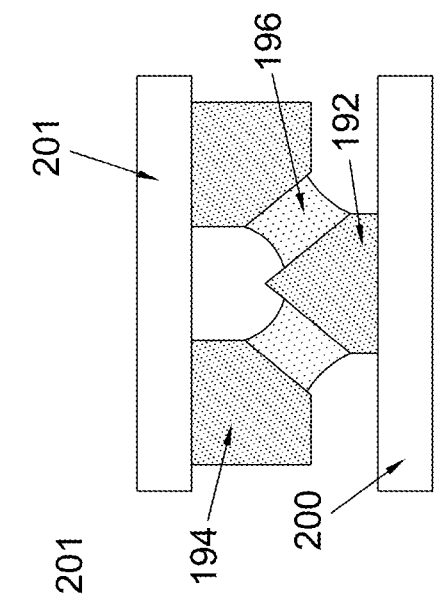
FIGS. 2A-2C show microfluidic alignment features.
Figure 2B:
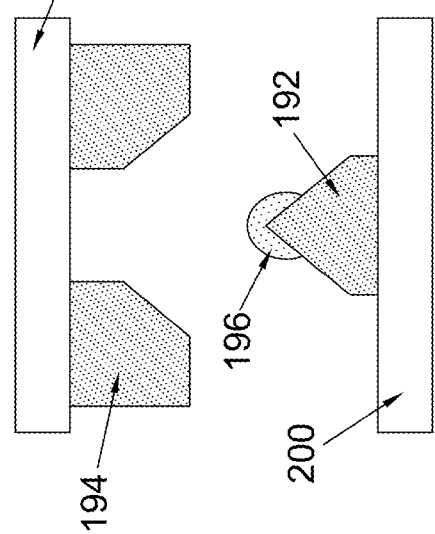
Figure 2A:
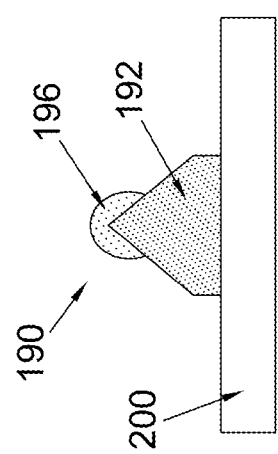

FIGS. 2A-2C show a first example of microfluidic alignment features 190, including lower features 192 and upper features 194 on lower and upper surfaces 200 and 201, respectively, and a liquid droplet 196. The lower features 192 and upper features 194 are positive and negatives features (with some additional flow control structures and a defined clearance) that are created on either side of the elements that need to be aligned (e.g., hardened replication feature 140 that may be present in proximity to, or remote from the microfluidic alignment features 190). A liquid droplet 196 is then dispensed on either or both of the lower features 192 and upper features 194. The lower surface 200 and upper surface 201 are brought into proximity to each other, so that the lower features 192 and upper features 194 are brought nearly into contact.

The lower and upper features 192, 194 generate capillary forces when brought into close enough proximity. Capillary action is the ability of a liquid to flow in narrow spaces without the assistance of, or even in opposition to, external forces like gravity; in this instance the narrow space is between the lower features 192 and upper features 194. Local changes in the capillary force alter the preferred direction of liquid flow. The liquid droplet 196 will try to equalize the positions of the lower and upper features 192, 194 to balance capillary pressures. The microfluidic alignment features 190 takes advantage of fluidic capillary pressure to make the upper and lower surfaces 200, 201 self-assembling.

The smaller the gap between surfaces, the higher the effect of capillary pressure. Therefore, on the micrometer scale as present here the capillary forces are high. The lower and upper features 192, 194 are shaped such that distances between them vary as does the contact angle between the liquid and the air outside of the lower and upper features 192, 194. This physical change causes the capillary force to rapidly change in a highly local manner; the liquid droplets 196 consequently urge the lower and upper features 192, 194 to shift to equalize the forces, and thereby align the surfaces.

In some embodiments, the liquid droplet 196 can be water, oil, some other liquid. The liquid droplet 196 can be made of a liquid that evaporates or disperses.

In some embodiments, the liquid droplet 196 can be a curable material. In such instances, once the upper and lower surfaces 200, 201 are aligned, the liquid droplet 196 can be cured, for example, by UV light or other curing method. The alignment of the upper and lower surfaces 200, 201 is thereby fixed.

Depending on the structure and size of the elements, multiple microfluidic alignment features 190 can be used. The features can be defined in different ways to force the alignment mainly in lateral directions or also include a component that drags the elements together.

In some embodiments, the microfluidic alignment features 190 can be in a circumferential ring that surrounds the optical elements on one or more of the upper and lower surfaces 201, 200. In such instance, the microfluidic alignment features 190 with cured liquid droplets 196 remain in place but does not affect the optical performance of the optical features due to being present only on the perimeter.

Figures 3A, 3B, 3C:
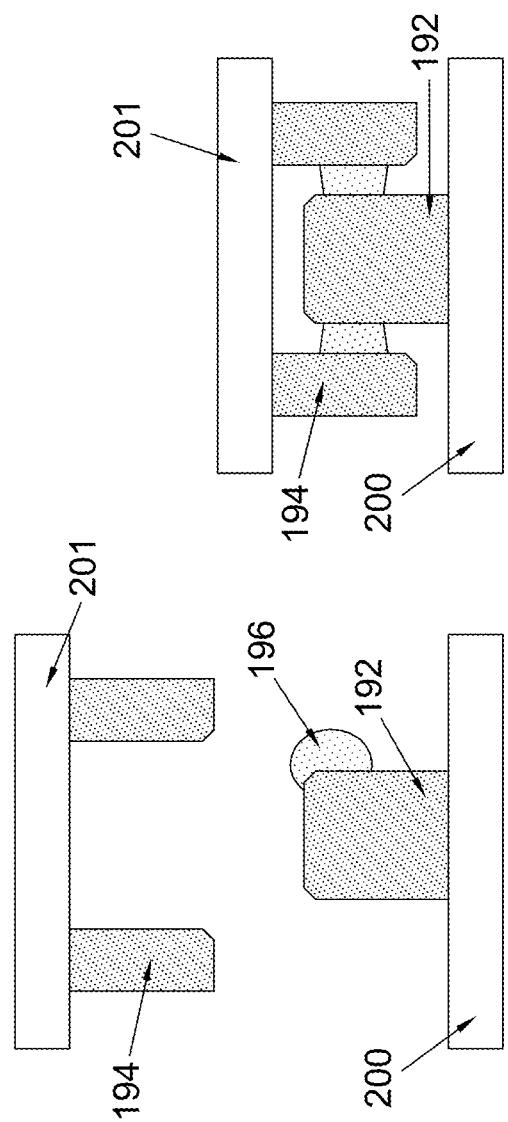
FIGS. 3A-3C show microfluidic alignment features.

FIGS. 3A-3C show a second example of microfluidic alignment features 190, similar to those of FIGS. 2A-2C. The alignment features 190 include lower features 192 and upper features 194 on lower and upper surfaces 200 and 201, respectively, and a liquid droplet 196. The lower features 192 and upper features 194 are positive and negatives features (with some additional flow control structures and a defined clearance) that are created on either side of the elements that need to be aligned (e.g., hardened replication feature 140 that may be present in proximity to, or remote from the microfluidic alignment features 190). A liquid droplet 196 is then dispensed on either or both of the lower features 192 and upper features 194. The lower surface 200 and upper surface 201 are brought into proximity to each other, so that the lower features 192 and upper features 194 are brought nearly into contact.

The lower and upper features 192, 194 generate capillary forces when brought into close enough proximity. Capillary action is the ability of a liquid to flow in narrow spaces without the assistance of, or even in opposition to, external forces like gravity; in this instance the narrow space is between the lower features 192 and upper features 194. Local changes in the capillary force alter the preferred direction of liquid flow. The liquid droplet 196 will try to equalize the positions of the lower and upper features 192, 194 to balance capillary pressures. The microfluidic alignment features 190 takes advantage of fluidic capillary pressure to make the upper and lower surfaces 200, 201 self-assembling.

The smaller the gap between surfaces, the higher the effect of capillary pressure. Therefore, on the micrometer scale as present here the capillary forces are high. The lower and upper features 192, 194 are shaped such that distances between them vary as does the contact angle between the liquid and the air outside of the lower and upper features 192, 194. This physical change causes the capillary force to rapidly change in a highly local manner; the liquid droplets 196 consequently urge the lower and upper features 192, 194 to shift to equalize the forces, and thereby align the surfaces.

In some embodiments, the liquid droplet 196 can be water, oil, some other liquid. The liquid droplet 196 can be made of a liquid that evaporates or disperses.

In some embodiments, the liquid droplet 196 can be a curable material. In such instances, once the upper and lower surfaces 200, 201 are aligned, the liquid droplet 196 can be cured, for example, by UV light or other curing method. The alignment of the upper and lower surfaces 200, 201 is thereby fixed.

Depending on the structure and size of the elements, multiple microfluidic alignment features 190 can be used. The features can be defined in different ways to force the alignment mainly in lateral directions or also include a component that drags the elements together.

In some embodiments, the microfluidic alignment features 190 can be in a circumferential ring that surrounds the optical elements on one or more of the upper and lower surfaces 201, 200. In such instance, the microfluidic alignment features 190 with cured liquid droplets 196 remain in place but does not affect the optical performance of the optical features due to being present only on the perimeter.

The replication manufacturing features as described herein advantageously enable the creation of densely packed layouts with, and modules or stacks where optical structures and mechanical (e.g., spacers) or electrical functionality (e.g., bond pads) are combined. The features can be used to generate more dense layouts, create packages including eye safety features, reduce the number of process steps by venting channel generation, and increase precision.

A number of embodiments of the invention have been described. Nevertheless, it will be understood that various modifications may be made without departing from the spirit and scope of the invention. Accordingly, other embodiments are within the scope of the following claims.

The invention claimed is:

1. A method of manufacturing optical elements, the method comprising:
   providing a first wafer having lower alignment features, comprising a first sloped lower alignment feature surface and a second sloped lower alignment feature surface;
   providing a second wafer comprising, on a replication side, at least one surface structure,
   the second wafer further comprising upper alignment features protruding, on the replication side, further than the at least one surface structure, wherein the upper alignment features comprise a first sloped upper alignment feature surface and a second sloped upper alignment feature surface;
   depositing liquid droplets on the first sloped lower alignment feature surface and the second sloped lower alignment feature surface of the first wafer and/or the first sloped upper alignment feature surface and the second sloped upper alignment feature surface of the second wafer; and
   aligning the first wafer and the second wafer with respect to each other and bringing the first wafer and the second wafer together, with liquid droplets between the first wafer and the second wafer, the first sloped lower alignment feature surface contacting the first sloped upper alignment feature surface and the second sloped lower alignment feature surface contacting the second sloped upper alignment feature surface through the liquid droplets, and thereby causing the first wafer to align with the second wafer by capillary action, wherein the lower alignment features are shaped such that distances between the lower alignment features and the upper alignment features depend on a contact angle between a liquid droplet of the liquid droplets and air outside of the lower alignment features and upper alignment features.

2. The method of claim 1, wherein the liquid droplets are deposited between the lower alignment features of the first wafer and the upper alignment features of the second wafer.

3. The method of claim 1, wherein the liquid droplets are deposited in a ring on the lower alignment features of the first wafer.

4. The method of claim 1, wherein the liquid droplets are deposited on the upper alignment features of the second wafer.

5. The method of claim 1, comprising hardening the liquid droplets.

6. An apparatus for manufacturing optical elements, the apparatus comprising:
   a first wafer having lower alignment features, comprising a first sloped lower alignment feature surface and a second sloped lower alignment feature surface; and
   a second wafer comprising, on a replication side, at least one surface structure,
   the second wafer further comprising at least one upper alignment feature,
      the upper alignment feature protruding, on the replication side, further than the at least one surface structure, wherein the upper alignment features comprise a first sloped upper alignment feature surface and a second sloped upper alignment feature surface;
      with liquid droplets deposited on the first sloped lower alignment feature surface and the second sloped lower alignment feature surface of the first wafer and/or the first sloped upper alignment feature surface and the second sloped upper alignment feature surface of the second wafer, and the second wafer and the first wafer aligned with respect to each other and bringing the first and second wafers together,
   the first sloped lower alignment feature surface contacting the first sloped upper alignment feature surface and the second sloped lower alignment feature surface contacting the second sloped upper alignment feature surface through the liquid droplets, and thereby causing the first wafer to align with the second wafer by capillary action,
   wherein the lower alignment features are shaped such that distances between the lower alignment features and the upper alignment features depend on a contact angle between a liquid droplet of the liquid droplets and air outside of the lower alignment features and upper alignment features.

7. The apparatus of claim 6, wherein the liquid droplets are deposited between the lower alignment features of the first wafer and the upper alignment features of the second wafer.

8. The apparatus of claim 6, wherein the liquid droplets are deposited in a ring on the lower alignment features of the first wafer.

9. The apparatus of claim 6, wherein the liquid droplets are deposited on the upper alignment features of the second wafer.

10. The apparatus of claim 6, wherein the liquid droplets deposited on the lower alignment features of the first wafer and/or the upper alignment features of the second wafer are hardened.

\* \* \* \* \*